Figure 1:
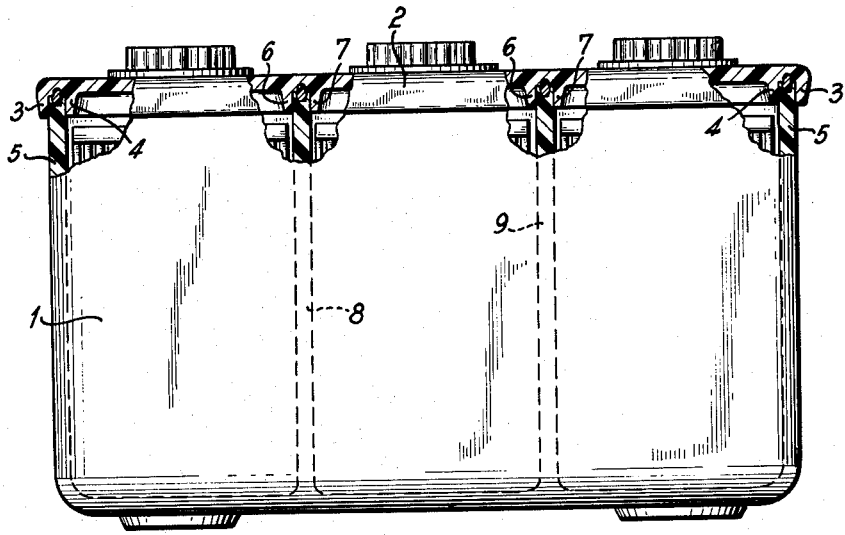

June 28, 1966             E. BLAICH             3,258,369
FLUID-TIGHTLY CLOSED DEVICES, SUCH AS STORAGE BATTERIES
OR THE LIKE, AND METHOD FOR MANUFACTURING THE SAME
Filed Nov. 18, 1963

INVENTOR
Emil Blaich
by Michael J. Striker
Atty

United States Patent Office 3,258,369
Patented June 28, 1966

3,258,369
FLUID-TIGHTLY CLOSED DEVICES, SUCH AS STORAGE BATTERIES OR THE LIKE, AND METHOD FOR MANUFACTURING THE SAME
Emil Blaich, Hildesheim, Germany, assignor to Robert Bosch G.m.b.H., Stuttgart, Germany
Filed Nov. 18, 1963, Ser. No. 324,384
Claims priority, application Germany, Nov. 29, 1962, B 69,809
9 Claims. (Cl. 136—170)

The present invention relates to devices, such as storage batteries, which are required to be fluid-tightly closed.

At the present time devices of this type may include members such as a housing member and a cover member one of which is formed with a groove and the other of which has an edge portion extending into this groove, and in order to provide a fluid-tight closure it is necessary to construct the edge portion and the groove very precisely so that they have a tight, very snug fit in order to provide the fluid-tight connection between these members. Of course, such structures require extremely accurate manufacture of the groove and the edge portion which is received therein in order to provide the required tight fit, and because even after the most careful manufacture sometimes the required tight fit still is not obtained it is customary to place between such a groove and edge which extends into the same additional sealing elements such as suitable sealing strips or the like, which of course render the structure even more expensive.

It is accordingly a primary object of the present invention to provide a structure of the above type which can be fluid-tightly closed without requiring an expensive precisely manufactured structure as has heretofore been required.

In particular, it is an object of the invention to provide a pair of members which are to be fluid-tightly connected respectively with a groove and an edge portion received in the groove even with substantial clearance while at the same time providing a very effective fluid-tight connection between these elements.

It is furthermore an object of the present invention to provide for a structure of the above type a fluid-tight connection which includes a sealing mass but where there is no possibility for the sealing mass to become located beyond the connection itself so that it is not possible for the sealing mass to enter into the interior of the fluid-tightly closed container.

Yet another object of the present invention is to provide a structure which is inexpensive to manufacture and assemble while at the same time providing a very effective fluid-tight seal.

With these objects in view the invention includes, in a device such as a storage battery, which requires a fluid-tight closure, a thermoplastic housing member and a thermoplastic cover member for covering and closing the housing member, one of these members being formed with an elongated groove and the other of these members having an edge portion which extends into this groove. The groove is defined by a base surface and a pair of side surfaces extending from the base surface, and the edge portion terminates in an end face which is directed toward the base surface of the groove and engages the base surface, this end face itself being formed with a longitudinal groove. Thus, the groove in the end face of the edge portion and the base surface which receives the edge portion cooperate to define an elongated passage, and this passage is, in accordance with the invention, filled with a sealing mass which is bonded to both of the members for forming therewith a fluid-tight connection between the members.

Figure 2:
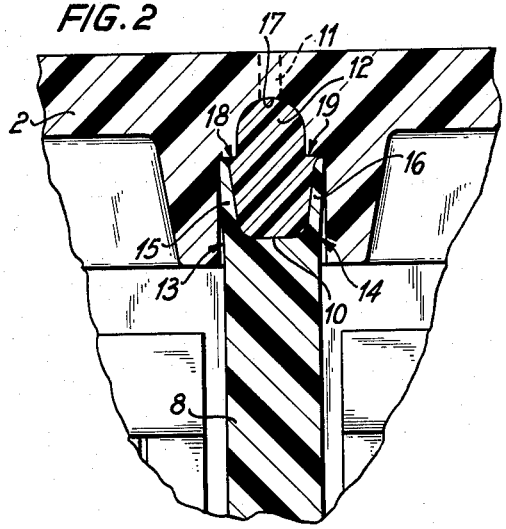

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional elevation of a storage battery constructed according to the present invention; and FIG. 2 is a fragmentary sectional view on an enlarged scale showing the details of the structure of the invention.

Referring now to the drawings, there is shown therein a storage battery which includes a housing member 1 made of suitable thermoplastic material such as polystyrene, and the storage battery includes a cover 2 which is made from the same material as the housing 1 and which is fluid-tightly connected thereto. Thus, the interior of the storage battery will be fluid-tightly closed by the connection of the cover 2 to the housing 1, and the invention resides in the structure of the fluid-tight connection between the housing member 1 and the cover member 2.

The cover member 2 is provided along its periphery with a pair of spaced parallel downwardly directed flanges 3 and 4 which thus define between themselves an elongated groove extending all along the peripheral edge of the cover 2 and directed downwardly. The housing member 1 has an endless side wall 5 terminating at its upper end in an elongated endless edge portion which is received in the groove which is formed between the downwardly directed flanges 3 and 4.

In addition, the cover 2 has between its ends two pairs of downwardly directed flanges 6 and 7 which cooperate in the manner illustrated in FIG. 1 to form a pair of transverse grooves between the cooperating flanges 6 and 7, and the flange 4 is interrupted at the portion thereof which extends between each pair of flanges 6 and 7, these flanges being joined at their ends integrally to the flange 4, so that in this way the grooves between the flanges 6 and 7 communicate at their ends with the endless groove between the flanges 3 and 4 to form a communicating network of grooves at the underside of the cover 2. The housing 1 is provided intermediate its ends with the transverse partition walls 8 and 9 which are integrally joined at their ends to the endless wall 5, and the upper edge portions of the transverse partition walls 8 and 9 are received in the grooves formed between the flanges 6 and 7. Thus, the left flange 6 of FIG. 1 is integrally joined at its ends to the portion of the flange 4 which extends to the left from this left flange 6, as viewed in FIG. 1, and forms therewith an endless flange which extends along the inner edge of the chamber formed by the wall 5 and the partition 8, and in the same way the separate cells or chambers of the storage battery are closed at their top ends by the flanges 3, 4, 6, 7.

The detailed construction of the joint between the cover and housing member is illustrated in FIG. 2, and while the details of FIG. 2 are directed to the joint between the transverse partition wall 8 and the left pair of flanges 6 and 7 of the cover 2 of FIG. 1, it is to be understood that the structure shown in FIG. 2 extends along the entire periphery of the cover 2 and along the entire length of the upper edge portions of the transverse partition walls 8 and 9. Thus, referring to FIG. 2 it will be seen that the upper edge portion of the housing member which extends into the groove of the cover member is formed in its top end face with a groove 10. This top end face of the upper edge portion of the housing member is of course directed toward the base surface of the groove which is formed in the cover member 2, and in fact engages this base surface, as indicated in FIG. 2, so that the base surface of the groove of the cover member 2 together with the top end face of the housing member, and in particular the groove 10 formed in this top end face, defines an elongated passage. This passage is filled, in a manner described below, with a sealing mass 12 which is bonded to both of the members so as to provide the fluid-tight connection therebetween. Of course, the groove 10 extends without interruption along the entire peripheral upper end face of the wall 5 as well as along the entire length of the transverse partition walls 8 and 9 with the grooves at the upper end faces of these partition walls communicating at their ends with the endless groove extending along the upper end face of the side wall 5, so that in this way the groove 10 has the configuration of an uninterrupted network of grooves. The cover 2 is formed with a plurality of openings 11 passing therethrough and communicating with the groove at the underside of the cover at a plurality of locations including the peripheral groove portion as well as the transverse groove portions, and these openings 11 are injection openings. The cover will be placed on the housing and held in a suitable clamp while an injecting device having a plurality of injecting nozzles arranged in the same pattern as the injection openings 11 is placed with these nozzles located in the openings 11, and then the sealing mass 12 is injected under pressure so as to fill the passage which is formed by the groove 10 and the base surface of the groove of the cover member 2.

As is apparent from FIG. 2, the upper edge portion of the housing member extends with clearaance into the groove of the cover member. Thus, the exterior side surface portions 13 and 14 of the wall 8 are illustrated spaced from the side surfaces of the groove of the cover member 2. The upper edge portion of the housing member has between the groove 10 and the exterior side surface portions 13 and 14 a pair of lips 15 and 16 which are flexible and which taper toward their upper free edges, as shown in FIG. 2, and in fact these upper free edges engage the base surface of the groove in the cover member 2. As a result, when the mass 12 is injected in the manner described above under pressure, this pressure is made sufficiently great so that the lips 15 and 16 will be spread apart from each other and will press against the side surfaces of the groove of the cover member 2, so that in this way it is not possible for any of the sealing mass 12 to flow around the free edges of the lips 15 and 16 into the interior of the container.

In one particular example of the structure according to the present invention, the lips 15 and 16 have a height of approximately 2.5 mm. and their thickness at their lower portions is in the region of 1 mm. while each lip tapers so as to terminate at its upper edge portion in a thickness of approximately 0.25 mm. The thickness of the edge portion of the housing member 1 which extends into the groove of the cover member 2 is on the order of 3 mm. and the cross section of the passage which is filled with the mass 12 is on the order of 8 square mm.

It will be noted that the free edges of the lips 15 and 16 engage the cover member 2 at the junction between the base surface and the side surfaces of the groove formed therein. Moreover, it will be seen from FIG. 2 that the base surface of the groove of the cover member is itself formed between the side surfaces of the groove of the cover member with an elongated continuous groove 17 which is situated midway between and spaced from the side surfaces of the groove of the cover member so as to provide at the opposite sides of the groove 17 a pair of shoulders 18 and 19 which form part of the base surface of the groove of the cover member 2 and which are respectively engaged by the free edges of the lips 15 and 16. The cross-sectional passage configuration shown in FIG. 2 filled by the mass 12 extends uniformly around the entire periphery of the storage battery as well as across the partitions thereof so that each cell is sealed by an endless passage filled with the mass 12 as shown in FIG. 2. The groove 17 greatly increases the area of contact between the mass 12 and the cover member 2 so as to securely fix the latter to the housing member 1. The shoulders 18 and 19 cooperate in the manner described above with the lips 15 and 16 so as to contribute to the result of preventing the mass from flowing around the free edges of the lips 15 and 16 into the interior of the housing. The surfaces of the groove 17 and the groove 10 are made as smooth as possible so that when the sealing mass 12 is injected into the passage defined by the grooves 17 and 10 this sealing mass will flow quickly and uniformly throughout the entire passage. over the complete network of communicating groove portions to provide a continuous fluid-tight connection between the cover member 2 and the housing member 1 along the entire upper end surface of the housing member 1.

The injected sealing mass 12 may consist of a thermoplastic material which is heated before injection to a flowable condition and which upon being injected into the passage softens the adjoining surfaces of the lips 15 and 16 as well as the base surface of the groove of the cover member 2, so that when the mass 12 and the housing and cover surfaces engaged by the same harden a particularly effective fluid-tight seal will be provided in which the sealing mass 12 is effectively fused with the lips 15 and 16 as well as with the cover member 2.

The invention is applicable to members made of a wide variety of thermoplastic materials, and thus the cover 2 and housing member 1 may be made of, for example, polystyrene, polyvinylchloride, polyethylene, polypropylene, the copolymer of styrene with butadiene, and the copolymer of styrene with acrylonitrile. Mixtures of polymers are also capable of being used with the invention. Moreover, while it has been indicated above that the sealing mass 12 is heated so as to become flowable, it is of course also possible to use a plastic which is rendered flowable by suspension in a suitable solvent.

Of course, it is also possible to use as a sealing mass 12 a synthetic resin which hardens very quickly or another adhesive substance which can be injected into the above-described passage. It is only required that when the sealing mass hardens the desired fluid-tight connection resulting from bonding of the sealing mass to the housing member and cover member will be provided.

In one specific example, a battery as described above was composed of polystyrene which is to say both the housing member 1 and the cover member 2 were made of polystyrene, and the sealing mass 12 itself was polystyrene which had been heated to 200° C. and then injected in the manner described above through nozzles and the injection openings 11 into the passage. The pressure at which the polystyrene, in molten form was injected was 30 atmospheres. After five minutes the nozzles were removed and the polystyrene was allowed to cool.

In another specific example, the housing member 1 and the cover 2 of the storage battery were made of a copolymer of styrene and butadiene and the same copolymer was used for the sealing mass 12. The battery had the construction shown in FIG. 1 and described above. A solution comprising 25% of the copolymer in finely pulverized form and 75% of carbon tetrachloride was prepared and allowed to stand for three hours in order to obtain a homogeneous clear solution. Then this solution was injected through the nozzles and the injection openings 11 into the passage and the entire assembly was left undisturbed for a few hours so that the solvent could evaporate to such an extent that the solution would not flow out of the injection openings of the cover as soon as the nozzles were removed. While this latter process will indeed provide an effective fluid-tight connection, the previously described process involving a heated thermoplastic sealing mass such as polystyrene is preferred because of the rapidity of the process and because in fact a superior connection is provided. Thus, in the above-described example involving a housing, cover member, and sealing mass all made of polystyrene, the nozzle assembly was removed after five minutes and after a cooling period of only fifteen minutes the cover and housing were firmly fixed to each other in a fluid-tight manner, so that such a method of manufacture obviously is preferable.

In the above examples the injection openings 11 are distributed all along the groove of the cover member 2 and are spaced from each other by a distance of approximately 10 cm., and the injection nozzle assembly has its nozzles arranged in the same pattern as the injection openings so that these nozzles project into all of these openings to simultaneously inject the sealing mass therethrough.

It will be understood that each of the elements described above, or two or more together, may also find a useful application in other types of fluid-tight closures differing from the types described above.

While the invention has been illustrated and described as embodied in closures for storage batteries or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device, such as a storage battery, which is required to be fluid-tightly closed, in combination, a housing member and a cover member for covering and closing said housing member, one of said members being formed with a groove and the other of said members having an edge portion extending into said groove, said groove being defined by a base surface and a pair of opposed side surfaces extending from said base surface and said edge portion of said other member terminating in an end face which engages said base surface of said groove, said end face itself being formed with an elongated groove extending longitudinally of said end face and defining with said base surface an elongated passage; and a sealing mass located in and filling said passage and bonded to said edge portion in said groove thereof as well as to said one of said members at said base surface of said groove of said one member, so that said members are fluid-tightly joined together.

2. In a device, such as a storage battery, which is required to be fluid-tightly closed, in combination, a housing member and a cover member for covering and closing said housing member, one of said members being formed with a groove and the other of said members having an edge portion extending into said groove, said groove being defined by a base surface and a pair of opposed side surfaces extending from said base surface and said edge portion of said other member terminating in an end face which engages said base surface of said groove, said end face itself being formed with an elongated groove extending longitudinally of said end face and defining with said base surface an elongated passage; and a sealing mass located in and filling said passage and bonded to said edge portion in said groove thereof as well as to said one of said members at said base surface of said groove of said one member, so that said members are fluid-tightly joined together, said edge portion extending with clearance into said groove of said one member and said groove in said end face of said edge portion being situated between a pair of lips of said edge portion, said edge portion having a pair of opposed side surfaces respectively directed toward and spaced from said side surfaces of said groove of said one member and said lips flowing outwardly away from each other and engaging said side surfaces of said groove of said one member in the region of said end face of said edge portion.

3. In a device, such as a storage battery, which is required to be fluid-tightly closed, in combination, a housing member and a cover member for covering and closing said housing member, one of said members being formed with a groove and the other of said members having an edge portion extending into said groove, said groove being defined by a base surface and a pair of opposed side surfaces extending from said base surface and said edge portion of said other member terminating in an end face which engages said base surface of said groove, said end face itself being formed with an elongated groove extending longitudinally of said end face and defining with said base surface an elongated passage; and a sealing mass located in and filling said passage and bonded to said edge portion in said groove thereof as well as to said one of said members at said base surface of said groove of said one member, so that said members are fluid-tightly joined together, said edge portion extending with clearance into said groove of said one member and said groove in said end face of said edge portion being situated between a pair of lips of said edge portion, said edge portion having a pair of opposed side surfaces respectively directed toward and spaced from said side surfaces of said groove of said one member and said lips flowing outwardly away from each other and engaging said side surfaces of said groove of said one member in the region of said end face of said edge portion, said lips terminating respectively in free edges which engage said one member respectively at the junctions between said base surface and side surfaces of said groove of said one member.

4. In a device, such as a storage battery, which is required to be fluid-tightly closed, in combination, a housing member and a cover member for covering and closing said housing member, one of said members being formed with a groove and the other of said members having an edge portion extending into said groove, said groove being defined by a base surface and a pair of opposed side surfaces extending from said base surface and said edge portion of said other member terminating in an end face which engages said base surface of said groove, said end face itself being formed with an elongated groove extending longitudinally of said end face and defining with said base surface an elongated passage; and a sealing mass located in and filling said passage and bonded to said edge portion in said groove thereof as well as to said one of said members at said base surface of said groove of said one member, so that said members are fluid-tightly joined together, and said base surface of said groove of said one member itself being formed with a longitudinal groove which determines, in part, the cross-sectional configuration of said passage, said mass filling the groove in said base surface as well as the groove in said end face of said edge portion.

5. In a device, such as a storage battery, which is required to be fluid-tightly closed, in combination, a housing member and a cover member for covering and closing said housing member, one of said members being formed with a groove and the other of said members having an edge portion extending into said groove, said groove being defined by a base surface and a pair of opposed side surfaces extending from said base surface and said edge portion of said other member terminating in an end face which engages said base surface of said groove, said end face itself being formed with an elongated groove extending longitudinally of said end face and defining with said base surface an elongated passage; and a sealing mass located in and filling said passage and bonded to said edge portion in said groove thereof as well as to said one of said members at said base surface of said groove of said one member, so that said members are fluid-tightly joined together, said base surface and said groove in said end face of said edge portion both being smooth so that said mass is bonded to smooth surfaces.

6. In a device, such as a storage battery, which is required to be fluid-tightly closed, in combination, a pair of thermoplastic members one of which is formed with an elongated groove defined by a base surface and a pair of opposed side surfaces extending from said base surface, and said base surface itself being formed between said side surfaces with an elongated groove situated substantially midway between and having a width less than the distance between said side surfaces so that said base surface defines with said side surfaces a pair of shoulders between which said groove of said base surface is located, said other member having an edge portion whose thickness is greater than the width of said groove of said base surface but less than the distance between said side surfaces, said edge portion being situated between said side surfaces and terminating in an end face which is formed with a longitudinal groove defined between a pair of lips of said edge portion which respectively terminate in free edges engaging said shoulders, so that said base surface, including said groove thereof, and said groove in said end face of said edge portion determine the cross section of an elongated passage which is formed by said members; and a sealing mass located in and filling said passage and bonded to said members for fluid-tightly connecting said members to each other.

7. In a device, such as a storage battery, which is required to be fluid-tightly closed, in combination, a housing member and a cover member for closing said housing member, both of said members being made of a thermoplastic material and one of said members being formed with an elongated groove defined by a base surface and a pair of side surfaces extending therefrom and the other of said members having an elongated edge portion located in said groove and terminating in an end face which is directed toward and engages said base surface of said groove, said end face itself being formed with a longitudinal groove which defines with said base surface an elongated passage; and a thermoplastic mass located in said passage, filling the same, and bonded to said members for fluid-tightly connecting them to each other.

8. In a storage battery, in combination, a thermoplastic housing having an endless side wall and a plurality of transverse partitions all terminating in a continuous upper edge portion having a top end face formed along its entire length with a continuous groove; a thermoplastic cover covering said housing and having an underside formed with a groove receiving the edge portion of said endless side wall and transverse partition walls of said housing and said groove of said cover having a base surface defining with said groove of said end face an elongated continuous passage; and a thermoplastic mass located in and filling said passage and bonded to said cover and said housing for fluid-tightly joining said cover to said housing.

9. In a method for fluid-tightly joining a pair of members one of which is formed with a groove and the other of which has an edge portion extending with clearance into said groove and terminating in an end face itself formed with a longitudinal groove situated between a pair of lips of said edge portion, said groove of said edge portion being directed toward a base surface of said groove of said one member and defining with said base surface an elongated passage, the step of injecting into said passage a sealing mass with a pressure sufficient to spread said lips apart from each other and into engagement with side surfaces of said groove of said one member.

References Cited by the Examiner

UNITED STATES PATENTS

| 1,169,788 | 2/1916 | Ford | 136—170 |
| 2,180,463 | 11/1939 | Dunzweiler | 136—170 X |
| 2,800,690 | 7/1957 | Olson | 22—13 |
| 2,827,197 | 3/1958 | Fiske | 220—45 X |

FOREIGN PATENTS 266,157　2/1927　Great Britain.

WINSTON A. DOUGLAS, *Primary Examiner.*

D. L. WALTON, *Assistant Examiner.*